United States Patent
Canepa

(10) Patent No.: US 12,433,728 B2
(45) Date of Patent: Oct. 7, 2025

(54) DENTAL HANDPIECE THAT HAS FLUSH CAPABILITY

(71) Applicant: Colt Harrison Canepa, Tequesta, FL (US)

(72) Inventor: Colt Harrison Canepa, Tequesta, FL (US)

(*) Notice: Subject to any disclaimer, the term of this patent is extended or adjusted under 35 U.S.C. 154(b) by 0 days.

(21) Appl. No.: 17/548,791

(22) Filed: Dec. 13, 2021

(65) Prior Publication Data

US 2023/0181299 A1    Jun. 15, 2023

(51) Int. Cl.
*A61C 17/022*    (2006.01)
*A61C 1/05*    (2006.01)
*A61C 17/02*    (2006.01)

(52) U.S. Cl.
CPC .......... *A61C 17/0217* (2013.01); *A61C 1/055* (2013.01); *A61C 17/0202* (2013.01); *A61C 17/022* (2013.01)

(58) Field of Classification Search
CPC ............ A61C 17/0217; A61C 17/0202; A61C 17/022; A61C 1/055
See application file for complete search history.

(56) References Cited

U.S. PATENT DOCUMENTS

| | | | |
|---|---|---|---|
| 3,638,310 A | 2/1972 | Austin, Jr. | |
| 3,778,903 A | 12/1973 | Gardella et al. | |
| 3,955,283 A | 5/1976 | Mehallick | |
| 4,118,866 A | 10/1978 | Ross et al. | |
| 4,176,453 A | 12/1979 | Abbott | |
| 4,194,289 A | 3/1980 | Neri | |
| 4,201,051 A | 5/1980 | Hall | |
| 4,676,750 A | 6/1987 | Mason | |
| 4,869,668 A * | 9/1989 | Seney | A61C 1/055 433/85 |

(Continued)

FOREIGN PATENT DOCUMENTS

| | | | |
|---|---|---|---|
| FR | 2584918 A3 * | 1/1987 | |
| KR | 20210047638 | 4/2021 | |

(Continued)

OTHER PUBLICATIONS

Handpiece Dental (a YouTube channel, specialized in dental handpieces) [online]. [Published: Mar. 10, 2020]. Retrieved from the Internet: https://www.youtube.com/watch?v=4mCEZAmsZYg (Year: 2020).*

(Continued)

*Primary Examiner* — Eric J Rosen
*Assistant Examiner* — Luis Ruiz Martin
(74) *Attorney, Agent, or Firm* — The Concept Law Group, PA; Scott D. Smiley; Scott M. Garrett

(57) ABSTRACT

A dental handpiece system includes a dental handpiece for operating a dental burr and providing a stream of water to the dental burr for cooling a tooth being acted upon by the dental burr. The dental handpiece further includes a flush water port for providing a flush water stream that is directed away from the dental burr to allow the dentist to flush a work site in a patient's mouth. The dental handpiece can also include an air outlet for providing a stream of air that is also not directed to the dental burr and that can be used to dry other dental instruments as well as work sites in the patient's mouth.

11 Claims, 12 Drawing Sheets

(56) References Cited

U.S. PATENT DOCUMENTS

| | | | |
|---|---|---|---|
| 5,022,857 A * | 6/1991 | Matsutani | A61C 3/02 |
| | | | 433/85 |
| 5,107,899 A | 4/1992 | Murphy | |
| 5,275,558 A * | 1/1994 | Seney | A61C 1/055 |
| | | | 433/84 |
| 5,334,013 A | 8/1994 | Meller | |
| 5,531,596 A | 7/1996 | Melde | |
| 5,538,425 A | 7/1996 | Reeves et al. | |
| 5,593,304 A | 1/1997 | Ram | |
| 5,836,766 A * | 11/1998 | Gugel | A61C 1/144 |
| | | | 415/904 |
| 8,123,522 B2 | 2/2012 | Varnes | |
| 2004/0014005 A1 * | 1/2004 | Kuhn | A61C 1/141 |
| | | | 433/127 |
| 2006/0127842 A1 | 6/2006 | Maxwell et al. | |
| 2007/0265605 A1 * | 11/2007 | Vaynberg | A61C 17/0202 |
| | | | 606/13 |
| 2013/0323672 A1 * | 12/2013 | Monty | A61C 1/0069 |
| | | | 433/29 |
| 2016/0317265 A1 | 11/2016 | Maurer et al. | |
| 2018/0228572 A1 * | 8/2018 | Fernandez | A61C 3/02 |

FOREIGN PATENT DOCUMENTS

| | | | | |
|---|---|---|---|---|
| WO | WO-9922663 A1 * | 5/1999 | | A61C 1/0076 |
| WO | WO-2021011970 A1 * | 1/2021 | | |

OTHER PUBLICATIONS

International Search Report and Written Opinion from the International Searching Authority at the United States Patent and Trademark Office, Authorized Officer Shane Thomas, Mailing Date Aug. 9, 2022, pp. 1-10.

* cited by examiner

DENTAL HANDPIECE THAT HAS FLUSH CAPABILITY

FIELD OF THE INVENTION

The present invention relates generally to dental handpieces used to drill in teeth, and, more particularly, relates to a dental handpiece that includes a flush water operation that is separate from the cooling water used to cool the tooth being drilled. The flush water operation provides a stream of water to flush a work location when the burr is not being used, and eliminates the need for a separate device that provides water and air.

BACKGROUND OF THE INVENTION

A dental handpiece is used by a dentist to hold and rotate a dental burr. They are also referred to as a "drill" although the burr operates somewhat differently than a drill bit. As the burr rotates, typically at very high rates, on the order of 100,000 revolutions per minute or higher, the dentist moves the burr into contact with portions of the tooth that are being removed. The action of the burr against the tooth creates heat, which could cause discomfort or even injury to the patient. To prevent heating, a small stream of water is directed to the burr, which cools the burr and tooth. Typically the operation of the burr is controlled by one or more foot pedals operated by the dentist. During a dental operation, while drilling on a tooth, debris and water build up in the patient's mouth, which are typically aspirated away through a vacuum tube hung in the patient's mouth.

After performing some drilling activity, the dentist will often flush the tooth and then dry it to get a better look at the state of the drilling. To do this, the dentist puts the hand piece back on its rack holder, and then picks up another apparatus that can alternately provide a stream of water, or air under pressure. This means the dentist is often switching between the hand piece with the burr and the apparatus for flushing/drying. This takes time, and provides an opportunity for one of the tools being dropped.

Therefore, a need exists to overcome the problems with the prior art as discussed above.

SUMMARY OF THE INVENTION

Embodiments of the inventive disclosure provide a dental handpiece that includes a body having a handle portion and a head, a rotatable chuck disposed in the head that is configured to hold a dental burr, a cooling water channel that passes through the handle and has an exit that is configured to provide a stream of water onto the dental burr, and a flush water channel that passes through the handle has an exit located between the head and the handle portion, and that is configured to direct a flush stream of water to a location other than to the dental burr.

In accordance with a further feature, there is further included a button valve on the handle, the head of the handpiece, a head of a hose assembly coupled to the handle, or an electric motor of the handpiece, and which is operable to allow water to flow through the flush water channel when pressed and is normally biased to prevent water from flowing in though the flush water channel.

In accordance with a further feature, there is further included an air channel that passes through the handle has an exit located between the head and the handle portion, and that is configured to direct a stream of air to a location below a tip of the dental burr.

In accordance with a further feature, there is further included a button valve on the handle, the head, a head of a hose assembly coupled to the handle, or an electric motor of the handpiece, and which is operable to allow air to flow through the air channel when pressed and is normally biased to prevent air from flowing in through the air channel.

In accordance with a further feature, the exit port is configured to direct the flush stream of water to a point below a tip of the dental burr.

Embodiments of the inventive disclosure provide a dental handpiece system that includes a dental handpiece having a body having a handle portion and a head, a rotatable chuck disposed in the head that is configured to hold a dental burr, a cooling water channel that passes through the handle and has an exit that is configured to provide a stream of cooling water onto the dental burr, and a flush water channel that passes through the handle and has an exit located between the head and the handle portion, and that is configured to direct a flush stream of water to a location other than to the dental burr. The system further includes a foot pedal for controlling operation of the dental burr wherein actuating the foot pedal results in the dental burr rotating and the stream of cooling water to flow onto the dental burr, wherein when the foot pedal is not actuated the dental burr does not rotate and the stream of cooling water does not flow.

In accordance with a further feature, there is further included a button valve on the handle, the head, a head of a hose assembly coupled to the handle, or an electric motor of the handpiece, and which is operable to allow water to flow through the flush water channel when pressed and is normally biased to prevent water from flowing in though the flush water channel.

In accordance with a further feature, there is further included an air channel that passes through the handle has an exit located between the head and the handle portion, and that is configured to direct a stream of air to a location below a tip of the dental burr.

In accordance with a further feature, there is further included a button valve on the handle, the head, a head of a hose assembly coupled to the handle, or an electric motor of the handpiece, and which is operable to allow air to flow through the air channel when pressed and is normally biased to prevent air from flowing in through the air channel.

In accordance with a further feature, the exit port is configured to direct the flush stream of water to a point below a tip of the dental burr.

In accordance with a further feature, the foot pedal is configured to allow water to flow to the flush water channel of the handpiece from an external water source when the foot pedal is not actuated.

In accordance with a further feature, the foot pedal is further configured to prevent water flowing to the flush water channel from the external water source when the foot pedal is actuated to operate the dental burr.

In accordance with a further feature, the foot pedal for controlling operation of the dental burr is a first foot pedal, the system further comprises a second foot pedal configured to control a flow of water to the flush water channel.

In accordance with a further feature, there is further included an air channel that passes through the handle and has an exit located between the head and the handle portion on an external surface of the handpiece, and that is configured to direct a stream of air to a location below a tip of the dental burr, and a third foot pedal configured to control a flow of air to the air channel.

Embodiments of the inventive disclosure provide a dental handpiece system that includes a dental handpiece having a body having a handle portion and a head, a connector formed at an end of the handle opposite the head that is configured to receive a mating connector, a rotatable chuck disposed in the head that is configured to hold a dental burr, a drive air channel configured to provide air to a rotor to drive the rotatable chuck, a cooling water channel that passes through the handle and has an exit that is configured to provide a stream of cooling water onto the dental burr, a flush water channel that passes through the handle has an exit located between the head and the handle portion, and that is configured to direct a flush stream of water to a location other than to the dental burr, and a drying air channel that passes through the handle and has an exit located between the head and the handle portion on an external surface of the handpiece, and that is configured to direct a stream of air to a location below a tip of the dental burr. The system further includes a hose assembly having the mating connector at a first end, and having a second end, the hose assembly having a cooling water line, a drive air line for providing air to the drive air channel, a flush water line that is connected to the flush water channel, and a drying air line that is connected to the drying air channel. The system also includes a foot pedal for controlling operation of the dental burr that is coupled to the second end of the hose assembly, wherein actuating the foot pedal results in air flowing through the drive air line from an air source and water flowing through the cooling water line from a water source.

In accordance with a further feature, the handle of the dental handpiece comprises a first button valve for controlling a flow of water through the flush water channel and a second button valve for controlling a flow of air through the drying air channel.

In accordance with a further feature, the foot pedal, when actuated, inhibits a flow of water through the flush water line and inhibits a flow of air though the drying air line.

In accordance with a further feature, there is further included a second foot pedal for controlling a flow of water to the flush water line from the water source, and a third foot pedal for controlling a flow of air to the drying air line from the air source.

Although the invention is illustrated and described herein as embodied in a dental handpiece and dental handpiece system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the body object being referenced. hose skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
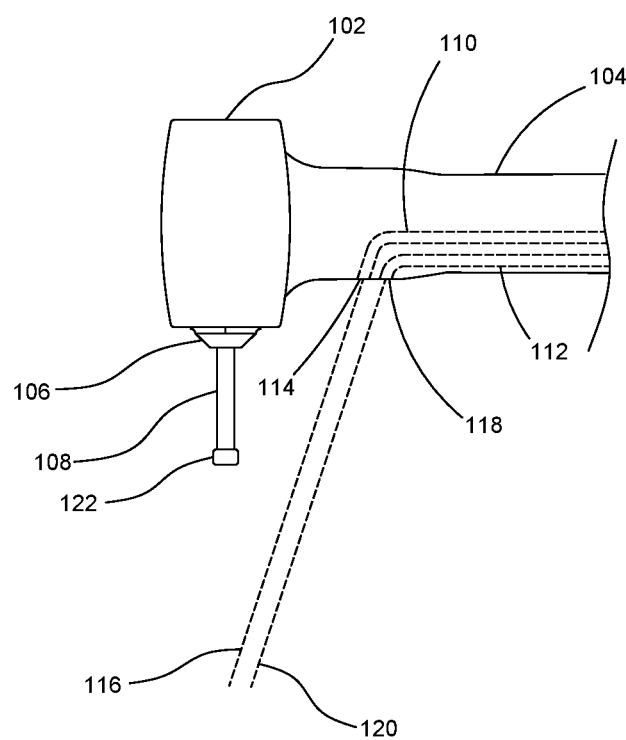
FIG. 1 shows a side view of the head of a dental handpiece having a flush functionality, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
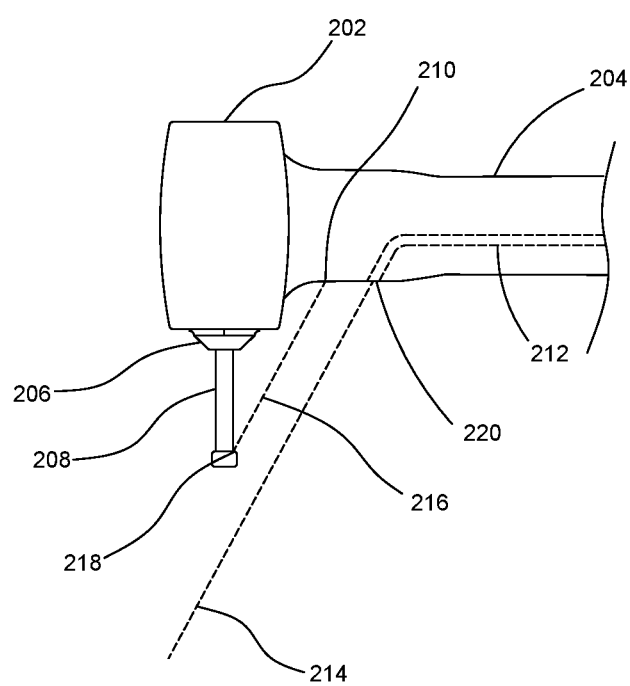
FIG. 2 shows a side view of a dental handpiece having a flush functionality and a cooling water stream, in accordance with some embodiments.

FIG. 1 shows a side view of the head of a dental handpiece 100 having a flush functionality, in accordance with some embodiments. The handpiece 100 has a head portion 102 and a handle portion 104. The head portion 102 includes either an air-driven turbine that rotates a chuck 106, or an electric motor to drive the chuck 106. The chuck 106 holds a burr 108 that has a tip 122 and edged portions for cutting. Rotation of the burr 108 is typically controlled by a foot pedal that is operated by the dentist. When the dentist actuates the foot pedal, in the case of an air-driven handpiece, compressed air is fed through tubing to the handpiece 100 to a connector on the end of the handle 104, and through an air channel through the handle 104 into a chamber inside the head portion 102. A return air channel allows air to escape from the chamber back through an exhaust channel through the handle. In an electric driven handpiece the foot pedal acts as a switch and speed control to provide electric power to the motor that drives the chuck 106. As a result, compressed air or an electric motor drives the chuck 106, and thereby the burr 108, to rotate. Many dental handpiece systems further provide water through a channel in the handpiece to stream water onto the burr 108 (as shown in FIG. 2). Under control independent of the operation of the burr 108 and cooling stream of water, a flush stream of water can be provided through a flush water channel 110, and a drying air stream can be provided through an air channel 112. The flush water channel 110 is terminated at an outlet 114 that directs the water coming through the flush water channel 110 to pass under the burr 108, at location 116. The rate of water flow through the flush water channel 110 is substantially more than the water used to cool the burr 108, and is equivalent to that provided by the separate flush apparatus commonly used in dental practice. The flush water flows out of an opening 114 at the bottom of the handle 104 and is directed to a location 116 under the burr 108, and not at the burr 108. That is, the opening 114 is configured so that water coming from the flush water channel 110 is not incident on the burr 108. Rather, location 116 can be below the burr 108 (assuming the burr is oriented vertically), or to the side of the burr 108. That is because the water coming from the opening is intended to flush a tooth being worked up, rather than to merely cool the burr 108 during operation of the burr 108 on a tooth. If the location 116 is directly under the burr 108, then the burr 108 can be used to point to the location 116 which can allow the dentist to better position the handpiece 100 to aim the flush stream of water to the desired site in the patient's mouth. Likewise, the air opening 118 is configured to direct air to a location below or to the side of the burr 108 to dry a site for better inspection by the dentist. Accordingly, given the rate of flow of the flush water, and it being aimed away from the burr 108, it is not suitable for cooling the burr 108 while the burr 108 is being used to remove matter. Accordingly, the flow of water through the flush water channel 110 can be inhibited while the burr 108 is in use (i.e. spinning) to prevent accidental emission of a flush stream of water.

FIG. 2 shows a side view of a dental handpiece 200 having a flush functionality and a cooling water stream, in accordance with some embodiments. As in FIG. 1, the handpiece 200 includes a head portion 202 and a handle portion 204. The head portion 202 is configured to drive the chuck to rotate a burr 208. During use of the burr 208, the dentist actuates a foot pedal to allow electric power of pressurized air into the handpiece, as is well known, to spin the chuck 206. At the same time, a small cooling burst 216 of water and air is emitted from a cooling port 210 that is the terminus of a cooling water channel through the handle 204. The cooling port 210 is configured to direct the stream 216 onto the burr 208, for example, at location 218. The handle 204 of the inventive handpiece also includes a flush water channel 212 that has an opening 220 that is configured to direct water to a location away from the burr 208 in a flush stream 214. In operation, the cooling water stream 216 operates in correspondence with operation of the burr 208; that is, when the burr 208 is rotating the cooling stream 216 is being emitted onto the burr 208. When the burr 208 stops, the cooling stream 216 also stops. The operation of the flush water stream 214 is independent of the operation of the burr 208 and cooling stream 216, and, in some embodiments, they can be exclusively operated such that the burr 208 cannot be activated when flushing and flush water stream 214 cannot be emitted when the burr 208 is operating.

Figure 3A:
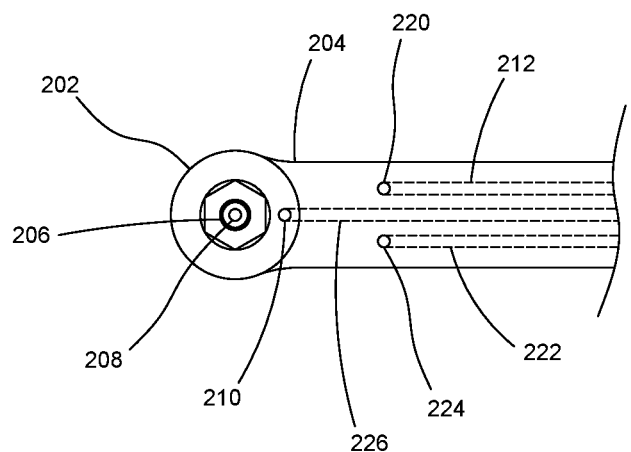
FIG. 3A is a bottom view of a dental handpiece having a flush functionality and a cooling water stream, in accordance with some embodiments.

FIG. 3A is a bottom view of a dental handpiece 200 and shows the cooling water channel 226 that provides water and air mist to the cooling port 210. In addition the flush water channel 212 is shown terminated by opening 220 in the bottom of the handle 204. An air channel 222 is also provided through the handle 204 and terminates at opening 224. Thus, the openings 220, 224 can be side by side, with water being emitted from one (220) and air being emitted from the other (224), under control of the dentist, or combined to operate through a single orifice. Accordingly, the dentist can operate the burr 208 with the cooling stream 216 being incident on the burr 208, and then flush the site with a flush stream 214 which does not hit the burr 208. Then, after aspirating water and debris away, the dentist can use air to dry the work site for better visual inspection.

Figure 3B:
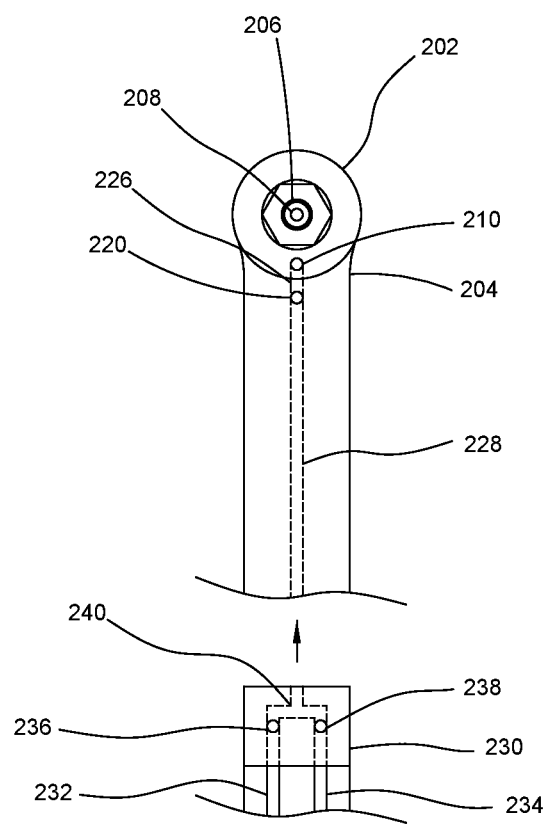
FIG. 3B is a bottom view of a dental handpiece having a flush functionality in which flushing water and drying air share a channel through the handpiece, in accordance with some embodiments.

FIG. 3B is a bottom view of a dental handpiece in which flushing water and drying air share a channel 228 through the handpiece, in accordance with some embodiments. A cable and/or hose assembly head 230 can provide both flushing water and drying air from separate sources, and combine them to a shared channel 240 which is then fluidly coupled to shared channel 228 through the dental handpiece to output port 220. The channel for the cooling air/water mix 226 is above (behind in this view) the shared channel 228. Separate air and water feeds 232, 234 are controlled by respective button valves 236, 238 which both allow air/water into combined feed 240. When the head 230 is coupled to the handle 204 of the handpiece, the feed 240 is fluidly coupled to shared channel 228. Thus, but flushing water and drying air pass through the shared channel 228 to output port 220 when the respective buttons 236, 238 are actuated by the dentist.

Figure 3C:
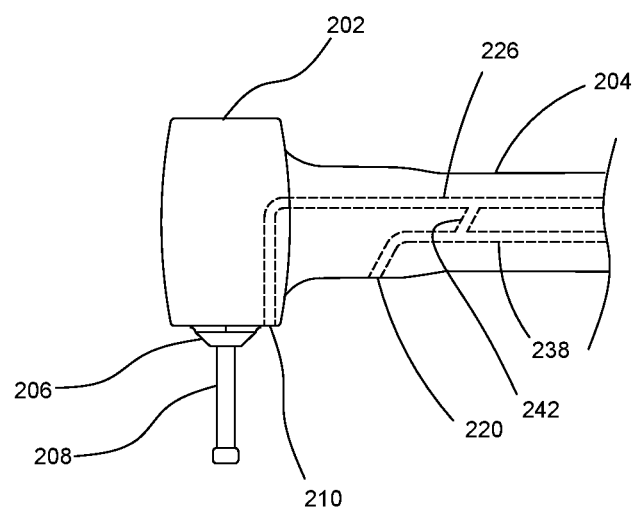
FIG. 3C is a side view of dental handpiece having a flush functionality in which flushing water and drying air share a channel through the handpiece and which is has a positive pressure air flow to prevent intrusion of detritus into the flush channel, in accordance with some embodiments.

FIG. 3C is a side view of dental handpiece having a flush functionality in which flushing water and drying air share a channel through the handpiece and which is has a positive pressure air flow to prevent intrusion of detritus into the flush channel, in accordance with some embodiments. Building on the dental handpiece of FIG. 3B, a low pressure source of air can be provided to the shared channel 228. By providing a low pressure air flow into shared channel 228, there will be a constant positive pressure at output port 220 that acts to prevent aerosolized and particulate matter from entering port 220 and lodging in channel 228. In the present example, the positive air flow is provided from the air channel 226 used to power the rotor in the head 202. However, the positive air pressure can be provided directly from, for example, a cable or hose assembly coupled to the handle 204 of the handpiece. For example, in head 230 of FIG. 3B, there can be a positive air flow provide into feed 240.

Figure 4:
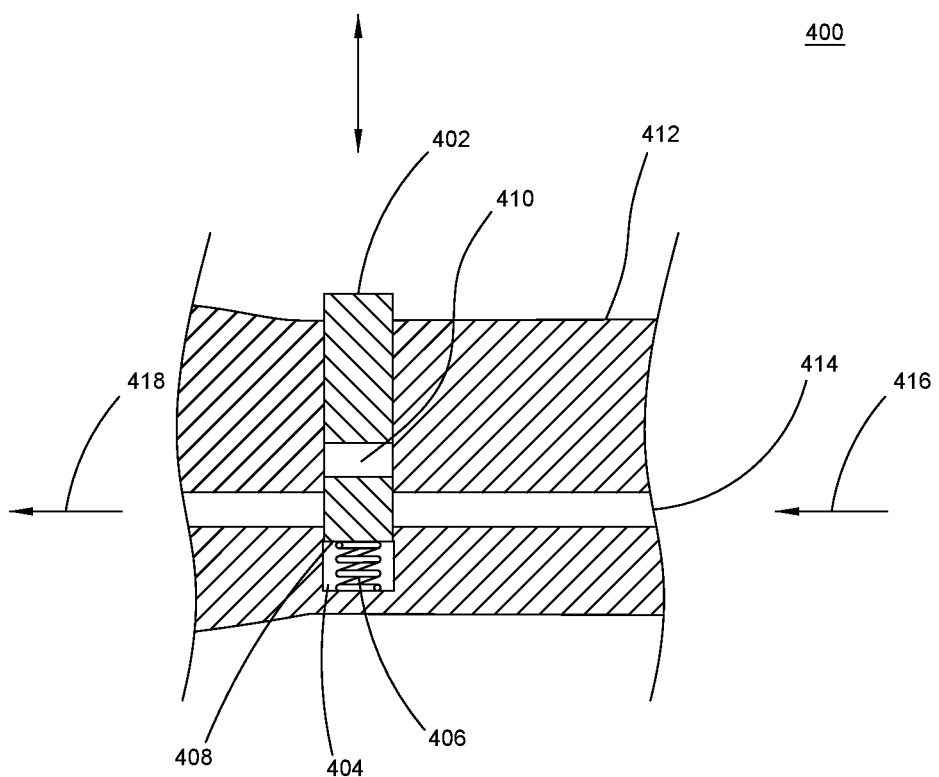
FIG. 4 is a side cutaway view of a portion of a dental handpiece including a button valve for controlling flush operation, in accordance with some embodiments.

FIG. 4 is a side cutaway view of a portion of a dental handpiece including a button valve for controlling flush operation, in accordance with some embodiments. To control operation of the flush water and air, a button valve can be used to interrupt or allow the flow of water. A portion of the handle 412 of the handpiece is shown here, cut vertically and along the handle 412 through the flush water channel 414. A valve actuator 402 is disposed in valve chamber 404 that interrupts the flush water channel 414, meaning the flush water channel 414 terminates on one side of the valve chamber 404 and continues on the other side, being open at both sides of the valve chamber. The valve actuator 402 has a valve channel 410 through the body of the valve actuator 402. A spring 406 biases the valve actuator 402 upward, such that the valve channel 410 is not aligned with the flush water channel 414, which prevents water from flowing through the flush water channel 414. Water on the first side of the valve actuator 402, indicated by arrow 416, is under pressure. If the user pushes the valve actuator downward, however, the valve channel 410 can be aligned with the flush water channel 414, allowing water to flow through the flush water channel, and out of the flush water port in the direction of arrow 418. The valve actuator 402 can be retained in the valve chamber 404 by a cap (not shown). A similar and parallel arrangement can be used for air.

Figure 5:
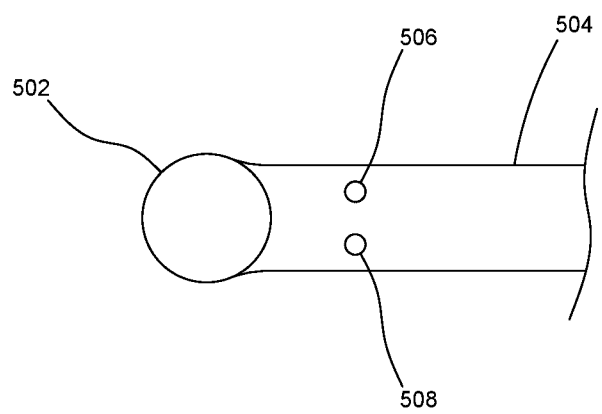
FIG. 5 is a top view of a dental handpiece having a flush functionality in which flush operation for water and air are controlled by buttons on the handpiece, in accordance with some embodiments.

FIG. 5 is a top view of a dental handpiece having a flush functionality in which flush operation for water and air are controlled by buttons on the handpiece, in accordance with some embodiments. The handpiece shown here is consistent with that shown in FIG. 4 and can use a similar button valve arrangement. The handpiece includes a head 502 and handle 504, with two valve buttons 506, 508 for controlling the flow of water and air, respectively. The bottom of the handpiece shown here can be substantially the same as shown in FIG. 3, where each valve button 506, 508 causes water and air to be emitted from ports on the bottom of the handle 504 adjacent the head 502, where the streams of water and air are directed so that they do not intersect with the burr. Thus, the dentist can operate the handpiece to remove decayed tooth matter with the burr, then lift the handpiece so that the burr is no longer in contact with the tooth, and actuate the flush water stream while holding the handpiece to direct the flush water stream to the work site. Then the dentist can actuate the air to dry the work site (or other object such as the dentist's mirror).

Figure 6:
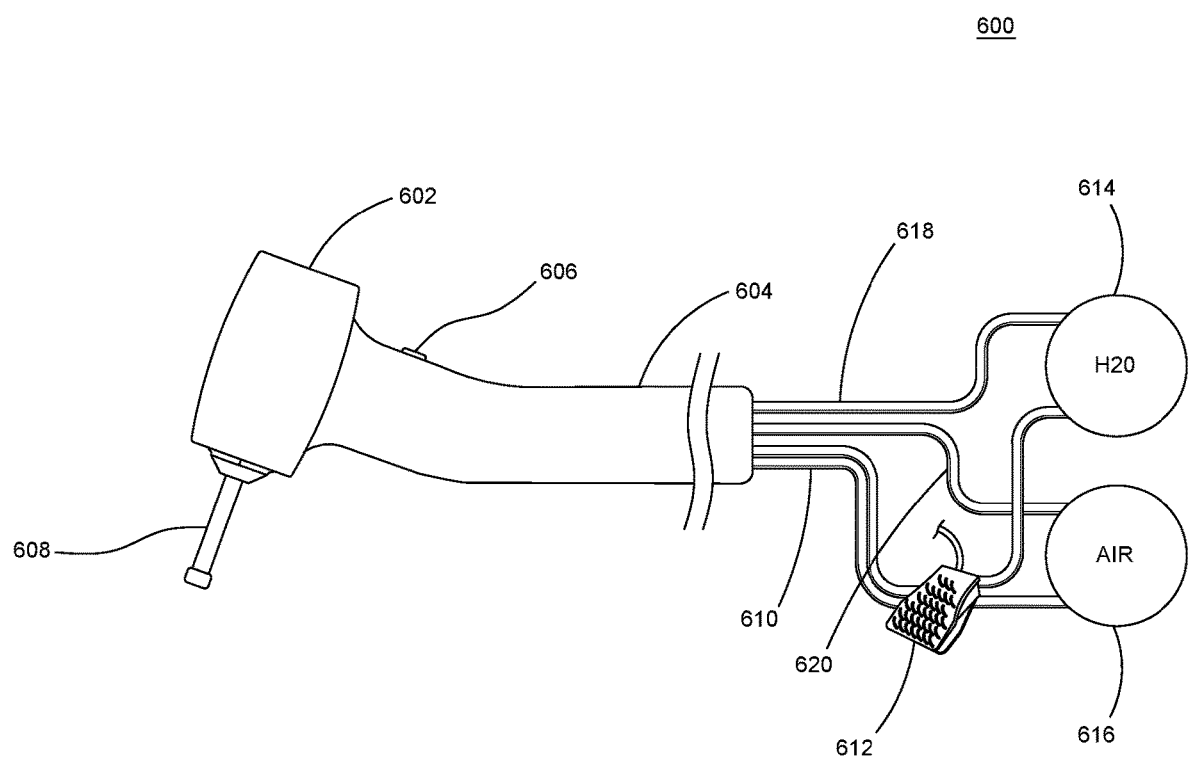
FIG. 6 shows a control system for operating a dental handpiece in accordance with some embodiments.

FIG. 6 shows a control system 600 for operating a dental handpiece in accordance with some embodiments. The handpiece has a head 602 and handle 604, and a chuck for holding and rotating a burr 608. On the handle 604 of the inventive handpiece are valve buttons such as button 606. The handpiece is operably connected to a pressurized water source 614 and a pressurized air source 616 through several lines. To control the operation of the burr 608, a foot pedal 612 is used to provide air and water through dual line 610 from the water and air sources 614, 616. When the dentist presses the foot pedal, air and water flow through lines 610 into corresponding channels through the handpiece. Pressurized air drives the rotation of the burr 608 while the water provided through the water line in lines 610 is used to cool the burr 608. Button 606 can be used to allow water to flow through the handpiece and out a flush port to provide a flush stream of water that is not directed to the burr 608. Pressing button 606, for example, allows water to flow from the source 614 through line 618, through the handpiece and a flush port of the handpiece. Similarly another button (not shown) can be used to allow air from the air source 616 to flow through line 620 and out of a port in the handle of the 604 of the handpiece. Lines 610, 618, and 620, while shown here separated, can be grouped together in a hose assembly that terminates with a connector that connects to the end of the handle of the handpiece, and directs air and water into the corresponding channels in the handpiece, similarly to present conventional handpiece systems.

Figure 7:
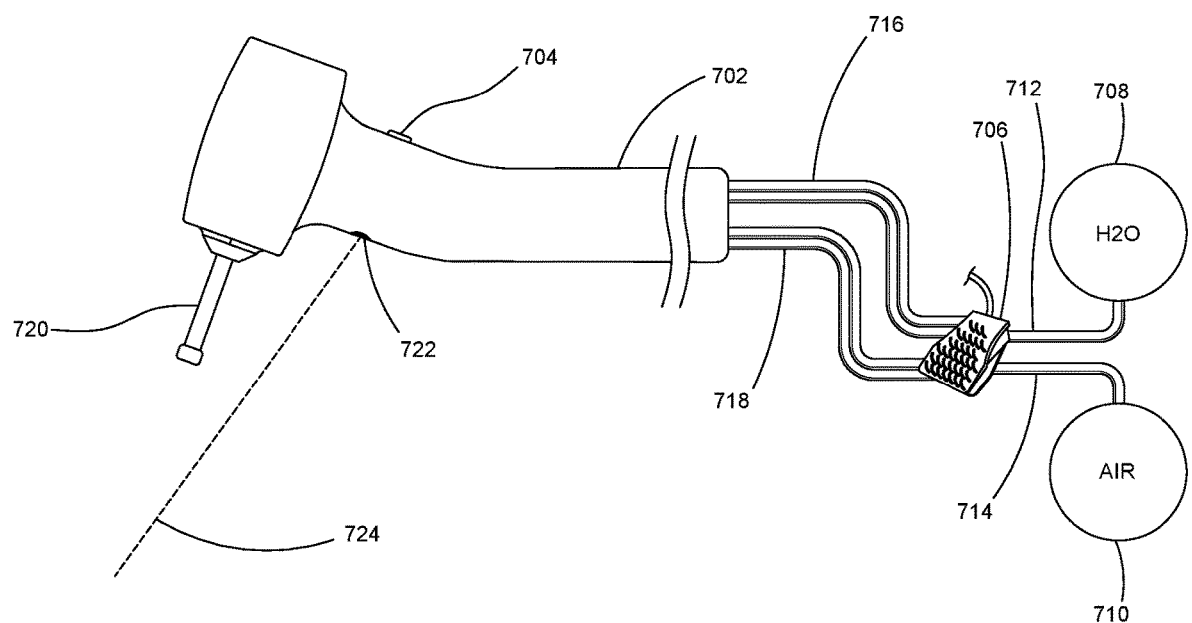
FIG. 7 shows a control system for operating a dental handpiece using a foot pedal that only allows either flush operation or burr operation exclusively, in accordance with some embodiments.

FIG. 7 shows a control system for operating a dental handpiece 702 using a foot pedal 706 that only allows either flush operation or burr operation exclusively, in accordance with some embodiments. The handpiece drives a burr 720 for removing tooth and other matter. A button 704 controls operation of a flush stream of water 724 that is selectively emitted from a flush port 722 at the bottom of the handle of the handpiece 702. A water source 708 provides water under pressure through a first line 712 to the foot pedal 706, and a pressurized air source 710 provided air through line 714 under pressure to the foot pedal 706. The foot pedal has two positions, and is biased into an off position in which the burr 720 is not being operated. Air and water are provided in a first dual line 718 to the handpiece, and separately through a second dual line 716. When the foot pedal is in the default off position, meaning the dentist is not stepping on the pedal, the foot pedal 706 is configured to inhibit water and air through the first dual line 718, and provide air and water to the second dual line 716. The air and water in the second dual line 716 is provided to the handpiece 702 where water can be selectively emitted through flush port 722 by pressing button 704. Likewise, air can be emitted through a neighboring port (next to port 722) by pressing another button (not in view here). When the pedal 706 is operated (stepped on), air and water are inhibited from flowing into the second dual line 716 and are then provided to the first dual air line 718 to operate the burr 720. Thus, when the pedal 706 is operated, pressing the button 704 can have no effect so that the dentist cannot accidently cause a flush stream of water or air to be emitted while operating the burr 720. Again, first and second dual lines 718, 716 can be collected together in a hose assembly that terminates at a connector that mates with the end of the handpiece 702 in a conventional manner. Each water and air line will have its own separate channel through the handpiece 702, which may also unite to exit a single orifice in some embodiments. To maintain positive pressure and inhibit the reverse flow of solid or liquid matter into the flush channels, an air-supplying branch from line 718 may be drawn to supply one or both of these channels.

Figure 8:
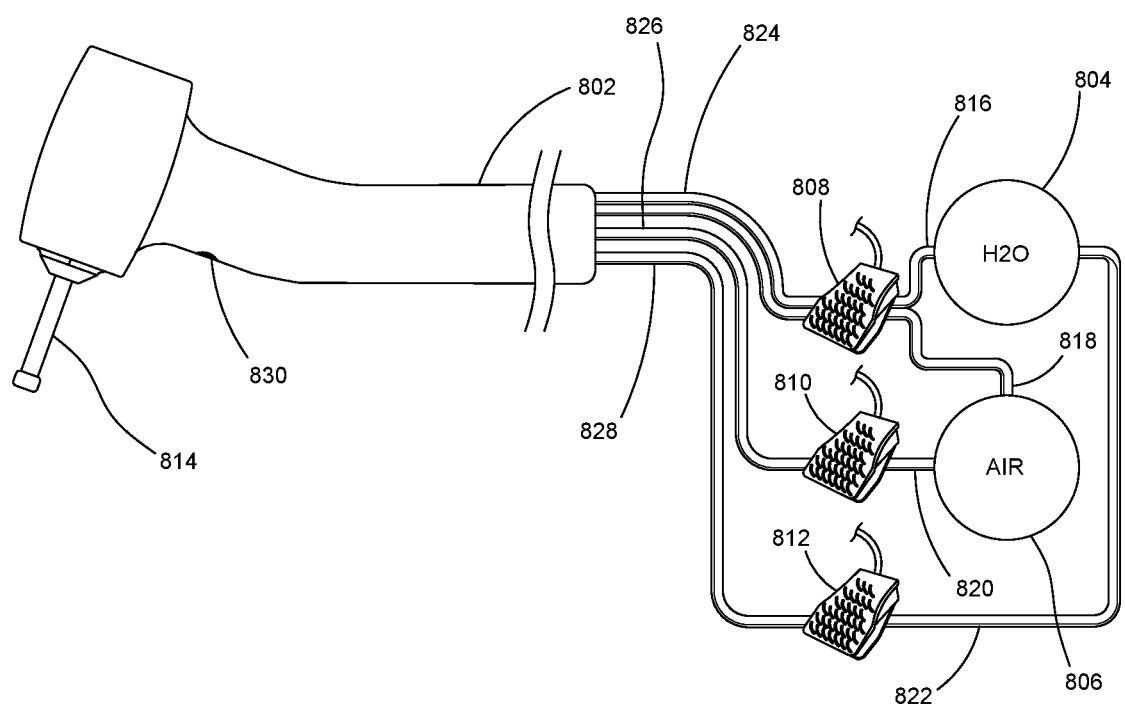
FIG. 8 shows a control system for operating a dental handpiece using separate foot switches for each of air flush, water flush, and burr operation, in accordance with some embodiments.

FIG. 8 shows a control system for operating a dental handpiece using separate foot switches for each of air flush, water flush, and burr operation, in accordance with some embodiments. Again, the handpiece 802 operates a burr 814 for removing matter and includes flush and drying capability by, for example, emitting a flush stream of water from a flush port 830. A water source 804 provide a source of water under pressure, and an air source 806 provide air under pressure. A first foot pedal 808 controls operations of the burr 814. Water is fed to the first foot pedal 808 through line 816, and air is fed to the first foot pedal 808 through line 818. The foot pedal acts like a switch that is biased to a default "off" state in which no electricity, air, or water flows through the pedal 808, or to the handpiece for operating the burr 814. When the dentist steps on the first foot pedal 808 air and water flow through the dual line 824 to cool the burr 814; the pressurized air turns the burr 814 and the water mist cools the burr 814. Thus, when the dentist lifts their foot off of the pedal 808, or sufficiently off to allow the foot pedal 808 to return to the "off" state, air and water cease flowing to the handpiece.

To provide a flush operation, the dentist can step on a second foot pedal 812, which is fed water through line 822 from the water source 804. Upon stepping on the second pedal 812, water flows through line 828 into the handpiece 802 and out flush port 830. Flush port 830 is configured so that the water stream emitted from the flush port 830 is not directed to the burr 814. Likewise, when the dentist steps on the third foot pedal 810, air from the air source 806 passes through feed line 820 to line 826 and to the handpiece 802 to be emitted from a port adjacent port 830 to provide a stream of air to dry a surface (e.g. tooth, filling, mirror). Thus, the flushing, drying, and drilling operations are exclusive as long as the dentist only steps on one foot pedal at a time. This arrangement avoids the need for buttons on the handpiece, also. To maintain positive pressure and inhibit the reverse flow of solid or liquid matter into the flush channels, an air-supplying branch from line 824 may be drawn to supply one or both of these channels.

Figure 9A:
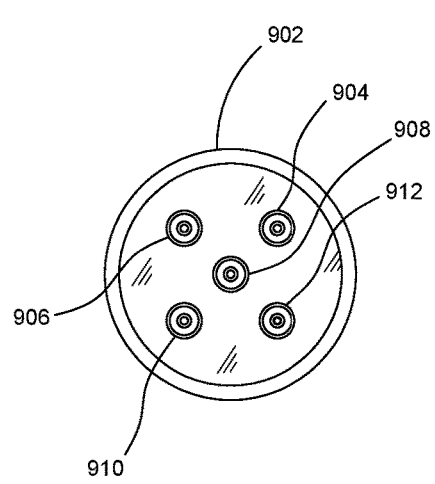
FIGS. 9A-9B show a connector interface for connecting a dental handpiece to a hose assembly, in accordance with some embodiments.
Figure 9B:
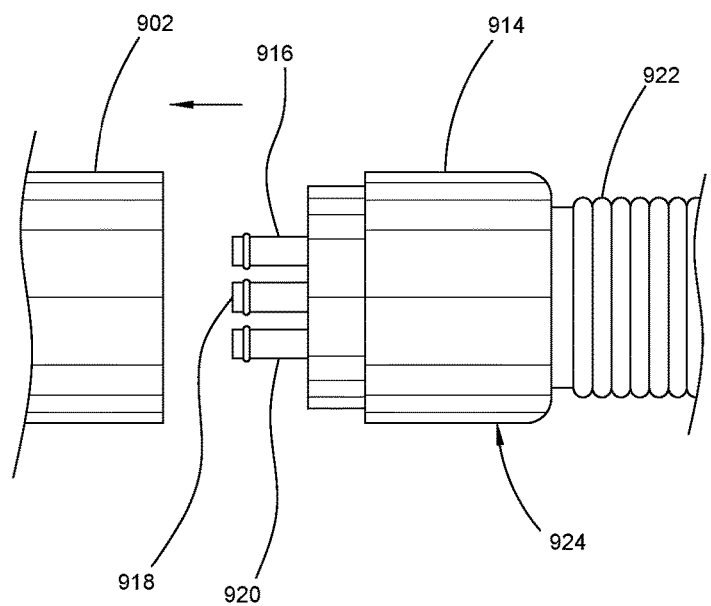

FIGS. 9A-9B show a connector interface for connecting a dental handpiece 902 to a hose assembly 924, in accordance with some embodiments. In electrically powered handpieces, this hose assembly incorporates a motor, which serves as the connection for such a handpiece. In FIG. 9A there is shown an end view of the handle of a dental handpiece, looking into the end of the handle, that is opposite the head at which the burr is located. FIG. 9B shows the connector of a hose assembly 924 being mated with the handpiece 902. In the end of the handpiece 902 in FIG. 9A there is shown several female receivers 904, 906, 908, 910, 912 that each receiver a corresponding one of the male connector extensions such as 916, 918, 920 (with two others not in view because of the angle of view). Receivers 904, 906 can be for air and water, respectively, for operation of the burr; air under pressure drives the burr to rotate and the water mist is used to cool the burr/tooth during operation of the burr. Receiver 908 can be an air return to allow air used to drive the chuck assembly in the head of the handpiece to return through the system rather than be exhausted at the handpiece. This can also serve as a source of positive pressure to prevent the retrograde flow of solid and liquid matter into the flush channels, should the tubing be united. Receivers 910, 912 can be for air and water used for drying and flushing when the burr is not being used. Thus, for example, receiver 904 can be connected to an air channel to the head of the handpiece to drive the rotor and the burr, and receiver 906 is connected to a water channel to provide cooling water to the burr. Likewise, receiver 908 is also coupled to an air channel to the head to receive air after it has passed by the rotor. Receiver 910 can be connected to a flush water channel to an opening on the handle that directs water in a direction such that it is not incident on the burr, and the flush water channel can be interrupted by a button valve or equivalent control mechanism to prevent the flow of water though the channel until the dentist needs to flush a work site. Similarly, receiver 912 can be an air channel that directs air to an opening on the handle of the handpiece to allow the dentist to direct a stream of air to a work site or object for drying. In electrical handpieces, various receivers such as 904, 906, and 908 are replaced with electrical plugs to engage a power outlet within the tubing. The hose assembly 924 includes a head 914 that mates with the end of the handpiece 902 and terminates a flexible hose guide 922 in which are the various tube lines for water and air corresponding to each of the receivers 904, 906, 908, 910, 912. Extending from the head are the extensions such as extensions 916, 918, and 920, that each insert into a corresponding one of the receivers 904, 906, 908, 910, 912. Thus, for example, extension 916 can provide water through receiver 906, extension 918 can receive air from receiver 908, and extension 920 can provide water to receiver 910 for flushing operations. It will be appreciated by those skilled in the art that various connector arrangement can be used equivalently as that shown here. Buttons to control air or water entering the flush channels may be also be placed at the head 914 of the hose assembly 924, or an electrical motor as well, and integrate with flush channels that travel through air- or electrically-driven handpieces, for users that favor the placement of controls at that location.

Figure 10:
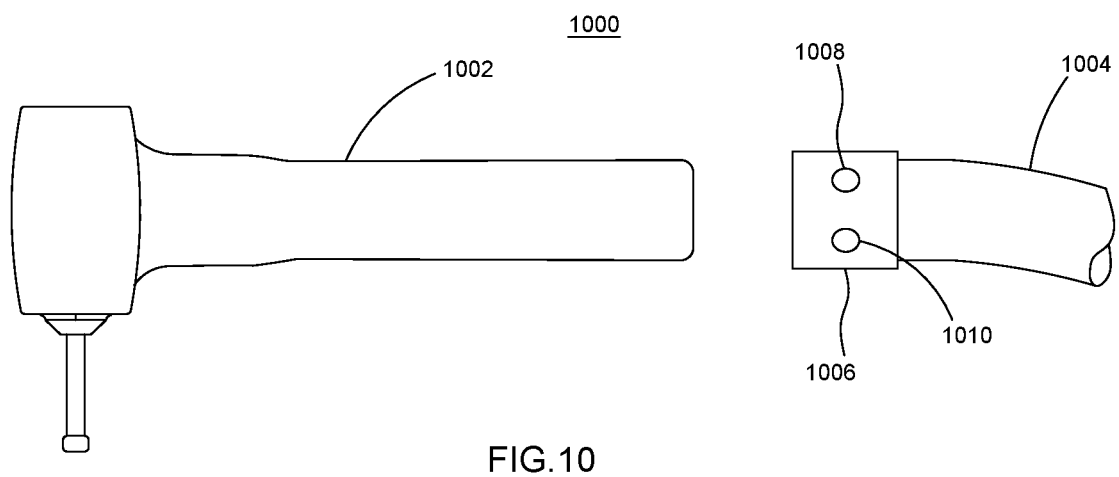
FIG. 10 is a side view of a dental handpiece having flush functionality in which the control buttons are located on a hose or cable assembly that is coupled to the dental handpiece, in accordance with some embodiments.

FIG. 10 is a side view of a dental handpiece 1000 having flush functionality in which the control buttons 1008, 1010 are located on the head 1006 of a hose or cable assembly 1004 that is coupled to the dental handpiece, in accordance with some embodiments. The head 1006 can comprise air and water line connectors as shown in FIGS. 9A, 9B, or it can use a common feed of flushing water and drying air (e.g. feed 240 of FIG. 3C), or in the case of handpieces that use electric power to operate the rotor, the head 1006 can include an electric motor that is coupled to a shaft in the handpiece that is coupled to the rotor. In either case (electric or air powered rotor), the head 1006 can include buttons 1008, 1010 for selectively providing a flushing water stream or a drying air stream by pressing or actuating the corresponding button 1008, 1010.

Figure 11:
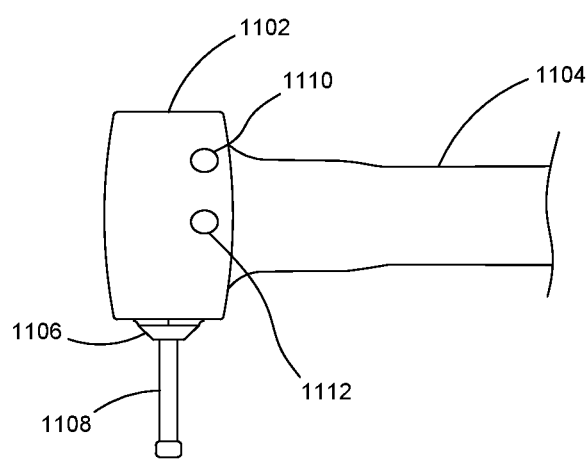
FIG. 11 is a side view of a dental handpiece having flush functionality in which the control buttons are located on the head of the dental handpiece, in accordance with some embodiments.

FIG. 11 is a side view of a dental handpiece having flush functionality in which the control buttons 1110, 1112 are located on the head 1102 of the dental handpiece, in accordance with some embodiments. As before, the dental handpiece includes the head, 1102 and handle 1104. The head 1102 includes a rotor that is air driven or mechanically driven by an electric motor. The rotor is coupled to and drives a chuck 1106 that is used to hold and impart rotation to a dental burr 1108. The dental handpiece here is designed as previously described handpieces, and is configured to provide flush water and drying air streams that are directed to a location other than the burr 1108. It is contemplated that in some embodiments that it may be preferable to locate the control buttons 1110, 1112 on the head 1102. The buttons 1110, 1112 control the flow of flushing water and drying air, respectively. Thus, the control buttons can be provided on the handle (e.g. FIG. 5), the head (e.g. FIG. 11), a head of a hose assembly coupled to the handle or an electric motor of the handpiece (e.g. FIG. 10). Likewise, both various configurations of foot pedals can be used to control the flow of flushing water and drying air.

A dental handpiece system has been disclosed that eliminates or reduces the need for a separate air/water apparatus for flushing and drying by incorporating those functions into a handpiece that also operates a dental burr. The inventive handpiece includes separate air and water channels for drying and flushing, respectively, or channels which share a single opening/port. Both the drying air and flushing water channel direct the air and water emitted from them away from the burr so that water from the flush water channel does not fall on, or otherwise hit the burr. Rather, the water is directed to a point away from the burr so that the dentist can lift the handpiece after using the burr, then actuate the flush water operation so that a flush water stream is emitted to the desired location. Thus, the dentist can perform flushing and drying operations without removing the head of the handpiece from the patient's mouth, thereby reducing the chance of dropping an apparatus, and reducing the time it take to perform dental operations.

The claims appended hereto are meant to cover all modifications and changes within the scope and spirit of the present invention.

What is claimed is:

1. A dental handpiece, comprising:
   a body having a handle portion and a head;
   a rotatable chuck disposed in the head;
   a dental burr held in the rotatable chuck;
   a cooling water channel that passes through the handle and has an exit that selectively directs a cooling stream of water at a cooling stream rate onto the dental burr only when the rotatable chuck is activated; and
   a flush water channel that has an exit located between the head and the handle portion, and that selectively directs a flush stream of water at a flush stream rate to a location away from the dental burr and wherein the flush stream of water is inhibited when the rotatable chuck is activated, wherein the flush stream rate is more than the cooling stream rate.

2. The dental handpiece of claim 1, further comprising a button valve on a head of a hose assembly coupled to the handle, and the button valve is operable to allow water to flow through the flush water channel when pressed and is normally biased to prevent water from flowing through the flush water channel.

3. The dental handpiece of claim 1, further comprising an air channel that passes through the handle has an exit located between the head and the handle portion, and that selectively directs a stream of air to a location below and away from a tip of the dental burr.

4. The dental handpiece of claim 3, further comprising a button valve on the handle, the head, a head of a hose assembly coupled to the handle, or an electric motor of the handpiece, and which is operable to allow air to flow through the air channel when pressed and is normally biased to prevent air from flowing in through the air channel.

5. The dental handpiece of claim 1, wherein the exit of the flush water channel is configured to direct the flush stream of water to a point below a tip of the dental burr.

6. A dental handpiece system, comprising:
   a dental handpiece having:
      a body having a handle portion and a head;
      a rotatable chuck disposed in the head;
      a dental burr held by the chuck;
      a cooling water channel that passes through the handle and has an exit that directs at stream of cooling water at a cooling stream rate onto the dental burr only when the rotatable chuck is rotating;
      a flush water channel that has an exit located between the head and the handle portion, and that selectively directs a flush stream of water at a flush stream rate to a location away from the dental burr and wherein the flush stream of water is only operable when the rotatable chuck is not rotating, and wherein the flush stream rate is greater than the cooling stream rate; and
   a button valve on one of the handle, the head, a head of a hose assembly coupled to the handle, or an electric motor of the handpiece, and the button valve is operable to allow water to flow through the flush water channel when pressed and is normally biased to prevent water from flowing in through the flush water channel.

7. The dental handpiece system of claim 6, further comprising an air channel that passes through the handle has an exit located between the head and the handle portion, and that selectively directs a stream of air to a location below a tip of the dental burr.

8. The dental handpiece system of claim 6, wherein the exit port is configured to direct the flush stream of water to a point below a tip of the dental burr.

9. The dental handpiece system of claim 6, further comprising:
   an air channel that passes through the handle and has an exit located between the head and the handle portion on an external surface of the handpiece, and that is configured to direct a stream of air to a location below a tip of the dental burr.

10. A dental handpiece system, comprising:
    a dental handpiece having:
       a body having a handle portion and a head;

a connector formed at an end of the handle opposite the head that is configured to receive a mating connector;
a rotatable chuck disposed in the head;
a dental burr held in the rotatable chuck;
a drive air channel configured to provide air to a rotor to drive the rotatable chuck and thereby rotate the dental burr;
a cooling water channel that passes through the handle and has an exit that directs a stream of cooling water at a cooling stream rate onto the dental burr when the burr is rotated, wherein the cooling stream of water is automatically provided when and only when the burr is rotating and is inhibited when the burr is not rotating;
a merged channel that has an exit located between the head and the handle portion, wherein the exit is directed to a location away from the dental burr;
a flush water channel that is coupled to the merged channel to provide a flush water stream of water at a flush stream rate into the merged channel so that the exit of the merged channel directs a flush stream of water to the location away from the dental burr, wherein the flush stream rate is greater than the cooling stream rate;
a drying air channel-that is coupled to the merged channel to provide a stream of air into the merged channel such that the exit of the merged channel selectively directs the stream of air to the location away from the dental burr;
a hose assembly having the mating connector at a first end, and having a second end, the hose assembly having a cooling water line, a drive air line for providing air to the drive air channel, a flush water line that is connected to the flush water channel, and a drying air-line that is connected to the drying air channel; and
a first button valve for controlling a flow of water through the flush water channel and a second button valve for controlling a flow of air through the drying air channel.

11. The dental handpiece system of claim 10, wherein, when the flush stream of water is not being provided through the merged channel, a positive flow of air is provided from the drying air channel into the merged channel to create a positive air flow at the exit of the merged channel.

\* \* \* \* \*